(12) United States Patent
Ítalo et al.

(10) Patent No.: US 12,444,311 B2
(45) Date of Patent: Oct. 14, 2025

(54) FLIGHT PLANNING SYSTEMS AND METHODS FOR AIRCRAFT

(71) Applicant: THE BOEING COMPANY, Chicago, IL (US)

(72) Inventors: Romani de Oliveira Ítalo, São José dos Campos (BR); Euclides Carlos Pinto Neto, Fredericton (CA); Stephen Solomon Altus, Campbell, CA (US); Rosa Maria Rodriguez, Madrid (ES); Pablo Costas Alvarez, Majadahonda Madrid (ES); Manuel Polaina Morales, Munich (DE)

(73) Assignee: The Boeing Company, Arlington, VA (US)

( * ) Notice: Subject to any disclaimer, the term of this patent is extended or adjusted under 35 U.S.C. 154(b) by 197 days.

(21) Appl. No.: 18/145,229

(22) Filed: Dec. 22, 2022

(65) Prior Publication Data
US 2024/0212511 A1 Jun. 27, 2024

(51) Int. Cl.
*G08G 5/34* (2025.01)
*G08G 5/21* (2025.01)
*G08G 5/76* (2025.01)

(52) U.S. Cl.
CPC ............. *G08G 5/34* (2025.01); *G08G 5/21* (2025.01); *G08G 5/76* (2025.01)

(58) Field of Classification Search
CPC .................................................. G08G 5/0039
See application file for complete search history.

(56) References Cited

U.S. PATENT DOCUMENTS

| | | | |
|---|---|---|---|
| 10,909,859 B1 * | 2/2021 | Dodd | G07C 5/0816 |
| 11,393,342 B1 | 7/2022 | Moeykens | |
| 11,442,472 B1 * | 9/2022 | List | G06F 21/31 |
| 11,488,483 B2 * | 11/2022 | Priest | G08G 5/0082 |
| 11,580,866 B2 * | 2/2023 | Gia | G06Q 10/08 |
| 11,722,462 B1 * | 8/2023 | List | H04L 9/3247 |
| | | | 713/176 |
| 11,770,445 B2 * | 9/2023 | Padmanabhan | H04L 9/3213 |
| | | | 709/203 |

(Continued)

FOREIGN PATENT DOCUMENTS

| | | | | |
|---|---|---|---|---|
| CN | 106297417 | | 1/2017 | |
| CN | 112789672 A | * | 5/2021 | ........... B64C 39/024 |

(Continued)

OTHER PUBLICATIONS https://www.icao.int/airnavigation/ffice/Pages/default.aspx.
https://ww2.jeppesen.com/flight-planning-and-dispatch/jetplanner/.
Extended European Search Report for App. No. 23217145.4-1009, dated May 10, 2024.
Machine translation of CN 113095548.

(Continued)

*Primary Examiner* — Jean Paul Cass
(74) *Attorney, Agent, or Firm* — Joseph M. Butscher; The Small Patent Law Group LLC

(57) ABSTRACT

A system and a method include a flight plan generating control unit configured to receive a flight plan request for an aircraft from a user interface, determine if the flight plan request matches a flight plan within a flight plan database, in response to the flight plan request matching the flight plan within the flight plan database, submit the flight plan to a validation sub-system, and in response to the flight plan request not matching the flight plan within the flight plan database, determine a new flight plan.

17 Claims, 3 Drawing Sheets

(56) References Cited

U.S. PATENT DOCUMENTS

| | | | |
|---|---|---|---|
| 11,790,786 B2 * | 10/2023 | Bosworth | G08G 5/0043 |
| | | | 701/120 |
| 11,846,523 B2 * | 12/2023 | Offenhaeuser | G01C 21/3484 |
| 11,875,690 B2 * | 1/2024 | Ali | G08G 5/0043 |
| 11,880,372 B2 * | 1/2024 | Padmanabhan | H04L 9/50 |
| 11,923,943 B2 * | 3/2024 | Casey | H04B 7/0617 |
| 11,963,203 B2 * | 4/2024 | Casey | H04W 72/51 |
| 2012/0158280 A1 * | 6/2012 | Ravenscroft | G08G 5/0034 |
| | | | 701/400 |
| 2016/0189549 A1 | 6/2016 | Marcus | |
| 2017/0278409 A1 | 9/2017 | Johnson | |
| 2020/0204375 A1 * | 6/2020 | Coulmeau | G06N 20/10 |
| 2020/0372808 A1 * | 11/2020 | Carraway | H04W 12/069 |
| 2021/0356953 A1 * | 11/2021 | Zavesky | G06V 20/20 |
| 2022/0292827 A1 * | 9/2022 | Chen | G06F 16/7854 |
| 2023/0351899 A1 * | 11/2023 | Fliszar | G05D 1/0204 |
| 2024/0051679 A1 * | 2/2024 | Bosson | B64D 45/00 |
| 2024/0212511 A1 * | 6/2024 | Romani de Oliveira Italo | |
| | | | G08G 5/003 |

FOREIGN PATENT DOCUMENTS

| | | | | |
|---|---|---|---|---|
| CN | 113095548 | | 7/2021 | |
| CN | 114299764 | | 4/2022 | |
| EP | 2667275 | | 11/2013 | |
| EP | 3251108 | A1 * | 12/2017 | B64C 39/024 |
| JP | 7454358 | B2 * | 3/2024 | G05B 13/042 |

OTHER PUBLICATIONS

Machine translation of CN 114299764.
Machine translation of CN 106297417.

\* cited by examiner

FLIGHT PLANNING SYSTEMS AND METHODS FOR AIRCRAFT

FIELD OF THE DISCLOSURE

Examples of the present disclosure generally relate to flight planning systems and methods for aircraft.

BACKGROUND OF THE DISCLOSURE

Aircraft are used to transport passengers and cargo between various locations. Numerous aircraft depart from and arrive at a typical airport every day. An aircraft flies from a departure airport to an arrival airport according to a flight plan. Typically, a pilot or aircraft operator files a flight plan with an airspace authority, such as the United States Federal Aviation Administration (FAA), which either approves or denies the flight plan, as filed.

A flight planner typically needs to generate flight plans that are compatible with the performance characteristics of a specific aircraft type used and, also airspace constraints imposed by the airspace authority. International flights typically need to be compatible with the airspace constraints of multiple airspace authorities, one for each sovereign airspace through which an aircraft is to travel. Flight plans fulfilling these requirements are considered feasible, and, in principle, can be flown.

If performance characteristics of an aircraft change only slightly throughout the entire useful life of an aircraft, airspace constraints can change significantly on a daily basis, or even multiple times in a day, depending on network congestion. In order to generate feasible flight plans, a flight planner typically considers an airspace including waypoints, airways, sectors, and the like. The flight planner also considers airspace constraints, some of which are more stable over time, such as airway senses and altitude senses, altitude constraints, restricted sectors, and the like, and some of which are of dynamic in nature, such as route availability, flow management measures, closure of flexible use airspace sectors, and storm regions. A flight planner can account for most of these factors, as long as the constraints are published by the airspace authority, either via System-Wide Information Management (SWIM), and/or legacy systems.

As an example, an existing flight planner issues a flight plan that is credible, but has a low probability of being flown without modification. This flight plan is submitted to the airspace authority, and each authority has a different process of acceptance. Often, an authority accepts the flight plan, but when the flight is about to occur, the authority provides a clearance that differs from the submitted flight plan. There may be time to optimize the payload and fuel uplift, but there may not be. As such, an aircraft may fly with inefficient payload and fuel amounts. In other cases, the airspace authority rejects the flight plan, and the dispatcher or pilot has to modify some part of the flight plan in order to get acceptance for filing. The modification may or may not be easy, and sometimes acceptance by the authority requires several iterations between dispatcher and airspace authority.

While a flight planner generates a flight plan, such a flight plan may not be realistic, thereby causing inefficiencies for operators and passengers. Such scenario is often caused by the dynamic nature of airspace constraints.

Ideally, a flight planner should issue a high proportion of initial flight plans that are flyable, and for which an operator can determine optimal quantities of payload and fuel, and accurately manage the timing of resource allocation. However, known approaches of programming airspace constraint rules in static program code are not cost-effective, in that known systems are unable to achieve worldwide adherence. Indeed, while some known systems may achieve a relatively high degree acceptance of flight plans with certain airspace authorities (for example, either Eurocontrol or the FAA), such flight plans may still not be cleared as filed. For international airlines that operate across regions, initial flight plan acceptance, involving simultaneous filings with different authorities, continues to be challenging.

SUMMARY OF THE DISCLOSURE

A need exists for an efficient and effective flight planning system and method. Further, a need exists for systems and methods that are able to provide flight plans that are accepted and cleared worldwide.

With those needs in mind, certain examples of the present disclosure provide a system including a flight plan generating control unit configured to receive a flight plan request for an aircraft from a user interface, determine if the flight plan request matches a flight plan within a flight plan database, in response to the flight plan request matching the flight plan within the flight plan database, submit the flight plan to a validation sub-system, and in response to the flight plan request not matching the flight plan within the flight plan database, determine a new flight plan.

In at least one example, the system also includes a flight plan reconstruction control unit configured to determine one or more portions of the flight plan from one or more flights plans as actually flown. In at least one example, the flight plan reconstruction control unit is configured to determine the one or more portions of the flight plan based on flight data received from a tracking sub-system. The one or more flight plans as actually flown differ from one or more flight plans as filed.

In at least one example, the flight plan is determined from a plurality of flight segments of a plurality of flight plans as actually flown. In at least one example, the flight plan includes portions that are one or both of determined from a plurality of flight segments of a plurality a plurality of flight plans as actually flown, or logically and physically possible and have not been marked as invalid in the flight plan database.

In at least one example, the flight plan generating control unit is further configured to, in response to the validation sub-system outputting a message indicating that the flight plan is invalid, determine if at least a portion of the flight plan is temporarily or permanently invalid. The flight plan generating control unit is further configured to discard the at least a portion of the flight plan from the flight plan database if the at least a portion of the flight plan is permanently invalid. The flight plan generating control unit is further configured to indicate that the at least a portion of the flight plan is temporarily invalid in response to the message indicating the at least a portion of the flight plan is temporarily invalid.

In at least one example, the flight plan generating control unit is configured to determine the new flight plan via an iterative graph search.

In at least one example, the flight plan generating control unit is further configured to recompute the flight plan based on one or both of current weather or payload of the aircraft before submitting the flight plan to the validation sub-system.

The flight plan generating control unit can be an artificial intelligence or machine learning system.

Certain examples of the present disclosure provide a method including receiving, by a flight plan generating control unit, a flight plan request for an aircraft from a user interface; determining, by the flight plan generating control unit, if the flight plan request matches a flight plan within a flight plan database; in response to the flight plan request matching the flight plan within the flight plan database, submitting, by the flight plan generating control unit, the flight plan to a validation sub-system; and in response to the flight plan request not matching the flight plan within the flight plan database, determining, by the flight plan generating control unit, a new flight plan.

Certain examples of the present disclosure provide a non-transitory computer-readable storage medium comprising executable instructions that, in response to execution, cause one or more control units comprising a processor, to perform operations as described herein.

DETAILED DESCRIPTION OF THE DISCLOSURE

Figure 1:
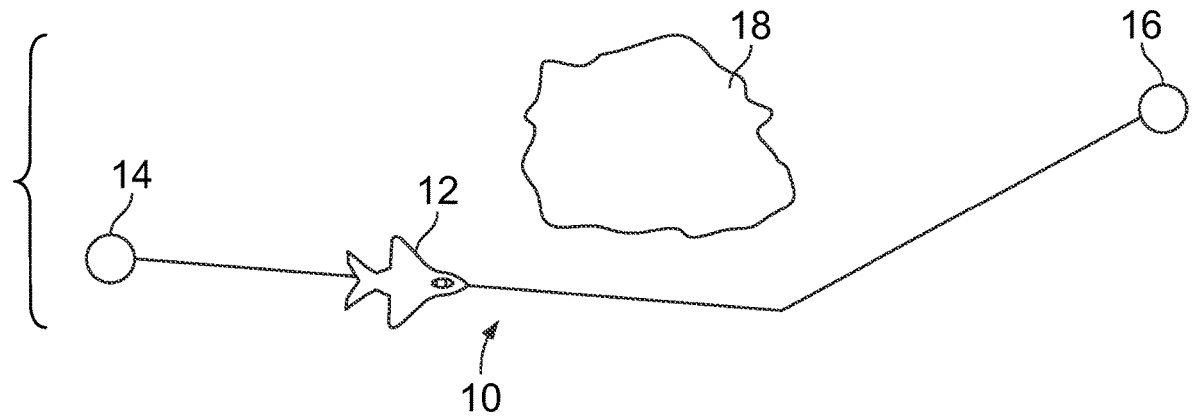
FIG. 1 illustrates a simplified view of a flight plan of an aircraft between a departure location and an arrival location.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and methods that generate flight plans that have high probability of acceptance by airspace authorities involved in their approval. The systems and methods can automatically update to any changes in route availability, airspace structure and other constraints associated with the airspace and its traffic rules.

The systems and methods described herein increase worldwide flight plan filing acceptance and clearing adherence, thereby reducing human workload necessary to elaborate, file and revise the flight plans, as well increasing the accuracy of payload and fuel management.

In contrast, known flight planners adopt an approach for updating that is highly dependent on human intervention and supervision for encoding airspace constraints and rules. These flight planners are usable in relation to dynamic airspace constraints, as long as their variability can be described by a finite set of rules, and subsequently the logic of these rules can be represented in a computer program composed by a static rule interpreter and a variable rule database, which can be called a "rule engine." However, if new rules for the airspace constraints appear (which is common), humans have to intervene and re-program the rules, so a new software development cycle begins. Introducing new rules may conflict with existing rules, so the verification and validation of the new software release must be thorough and requires significant time and effort. Further, none of the known flight planners are applicable worldwide. As such, an operator that utilizes such flight planners typically needs to prioritize airspace regions and other features in order to choose the least bad option according to certain criteria. As such, the known planners may produce low filing acceptance rates and adherence in certain parts of the world.

Typically, the problem of clearance adherence is beyond considerations of software engineering, because a flight plan can be accepted by the airspace authority as one solution among many possible ones for a certain time-origin-destination, but there is no guarantee that it will be cleared to fly as filed. The Air Navigation Service Provider (ANSP), which is the executive manager of the airspace authority, has discretionary power to provide a clearance that differs from the filed flight plan, as long as allowed by the airspace constraints, without a deterministic criterion. Moreover, because of this non-determinism, achieving high adherence is considered out of the scope of known flight planners and is commissioned to the experience of dispatchers and pilots.

In contrast, examples of the present disclosure provide systems and methods that do not rely on static program to codify airspace constraints and traffic rules. Instead, the systems and methods described herein use a data-driven, continually updated database of proven flight plans, associated with an adaptable model of the airspace, in order to generate flight plans that increase filing acceptance and clearance adherence, and reduce the need for manual software coding.

FIG. 1 illustrates a simplified view of a flight plan 10 of an aircraft 12 between a departure location 14 (such as a first airport) and an arrival location 16 (such as a second airport). The flight plan 10 includes a route or path between the departure location 14 and the arrival location 16. For example, the flight plan 10 can be determined to avoid inclement weather 18, such as rain, wind, snow, and/or the like.

Figure 2:
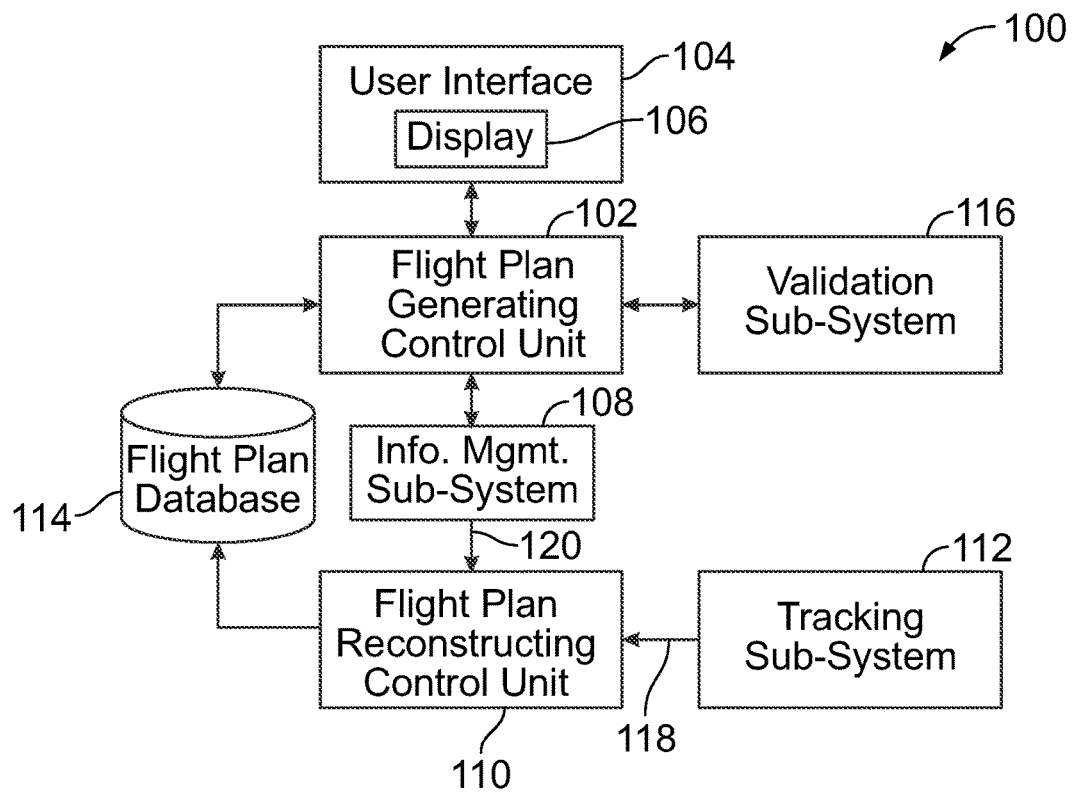
FIG. 2 illustrates a schematic block diagram of a flight planning system, according to an example of the present disclosure.

FIG. 2 illustrates a schematic block diagram of a flight planning system 100, according to an example of the present disclosure. The flight planning system 100 includes a flight plan generating control unit 102 in communication with a user interface 104, such as through one or more wired or wireless connections. The flight plan generating control unit 102 and the user interface 104 can be co-located, or remotely located from one another. In at least one example, the flight plan generating control unit 102 and the user interface 104 are in communication with one another through a private network or a public network, such as the Internet, one or more antennas or transceivers, and/or the like.

The user interface 104 includes a display 106, such as an electronic screen, monitor, television, or the like. The user interface 104 can be a computer workstation. In at least one example, the user interface 104 can be, or part of a flight computer of an aircraft. As such, the user interface 104 can be onboard an aircraft. In at least one other example, the user interface 104 can be remotely located from an aircraft, such as located at an airport, central monitoring location, airline operator location, and/or the like. In at least one example, the user interface 104 can be, or part of a handheld device, such as smart phone, smart tablet, or the like.

In at least one example, the flight plan generating control unit 102 is also in communication with an information management sub-system 108, such as through one or more wired or wireless connections. The flight plan generating control unit 102 can be co-located with, or remotely located from, the information management sub-system 108. The flight plan generating control unit 102 and the information management sub-system 108 can be in communication with one another through a private network or a public network, such as the Internet, one or more antennas or transceivers, and/or the like.

The information management sub-system 108 is configured to publish various data from an airspace authority. For example, the information management sub-system 108 is configured to publish constraints regarding an airspace. As an example, the information management sub-system 108 is the System-Wide Information Management (SWIM).

A flight plan reconstructing control unit 110 is in communication with the information management sub-system 108 and/or the flight planning generating control unit 102 through one or more wired or wireless connections. The flight plan reconstructing control unit 110 can be co-located with, or remotely located from, the information management sub-system 108 and/or the flight plan generating control unit 102. The flight plan reconstructing control unit 110, the information management sub-system 108, and/or the flight plan generating control unit 102 can be in communication with one another through a private network or a public network, such as the Internet, one or more antennas or transceivers, and/or the like.

In at least one example, the flight plan generating control unit 102 and the flight plan reconstructing control unit 110 are separate and distinct from one another. In at least one other example, the flight plan generating control unit 102 and the flight plan reconstructing control unit 110 are part of a single, common control unit.

The flight plan reconstructing control unit 110 is also in communication with a tracking sub-system 112, which is configured to track (such as through global positioning system (GPS) signals, radar, automatic dependent surveillance-broadcast (ADS-B) signals, and/or the like positions of aircraft within an airspace. In at least one example, the tracking sub-system 112 is configured to track positions of aircraft throughout the world. As such, the tracking sub-system 112 can be a global aircraft tracking sub-system. The flight plan reconstructing control unit 110 can be co-located with, or remotely located from, the tracking sub-system 112. The flight plan reconstructing control unit 110 and the tracking sub-system 112 can be in communication with one another through a private network or a public network, such as the Internet, one or more antennas or transceivers, and/or the like.

The flight plan generating control unit 102 and the flight plan reconstructing control unit 110 are also in communication with a flight plan database 114, such as through one or more wired or wireless connections. The flight plan database 114 stores data regarding flight plans of aircraft. The flight plan database 114 can be co-located with, or remotely located from, one or both of the flight plan generating control unit 102 and/or the flight plan reconstructing control unit 110. The flight plan database 114, the flight plan generating control unit 102, and the flight plan reconstructing control unit 110 can be in communication with one another through a private network or a public network, such as the Internet, one or more antennas or transceivers, and/or the like.

The flight plan generating control unit 102 is also in communication with a validation sub-system 116, such as an airspace authority flight plan validation server, through one or more wired or wireless connections. The generating control unit 102 and the validation sub-system 116 can be co-located with, or remotely located from, the flight plan generating control unit 102. The flight plan generating control unit 102 and the validation sub-system 116 can be in communication with one another through a private network or a public network, such as the Internet, one or more antennas or transceivers, and/or the like.

As descried herein, the system 100 includes one or more control units (such as the flight plan generating control unit 102) configured to receive a flight plan request from the user interface 104. The control unit(s) then determine if the flight plan request matches a flight plan within the flight plan database 114. In response to the flight plan request matching the flight plan within the flight plan database, the control unit(s) submit the flight plan to the validation sub-system 116. In response to the flight plan request not matching the flight plan within the flight plan database, the control unit(s) determining a new flight plan.

In operation, the flight plan reconstructing control unit 110 receives flight data 118 from the tracking sub-system 112. The flight data 118 includes executed flight plans of one or more aircraft. In at least one example, the flight data 118 includes flight tracks of aircraft that have flown throughout the world. The flight plan reconstructing control unit 118 receives the flight data 118, and reconstructs executed flight plans of the aircraft. For example, the flight plan reconstructing control unit 118 collects flight tracks of the aircraft from a defined airspace, such as from a region, hemisphere, or the entire world, and combines the airspace covered by tracking sub-system 112 and the airspace covered by the information management sub-system 108, such as SWIM. The flight plan reconstructing control unit 118 can combine such because trajectories cleared by air navigation service providers can be different from filed flight plans. As such, the flight plan reconstructing control unit 110 obtains flight plan data 120 of the aircraft, which includes the flight plans, from the information management sub-system 108, and matches the flight plans within the flight plan data 120 with the flown trajectories of the aircraft, as received in the flight data 118 from the tracking sub-system 112.

The flight plan data 120 received from the information management sub-system 108 and the flight data 118 received from the tracking sub-system 112 are received by the flight plan reconstructing control unit 110. The flight data 118 regarding flight of aircraft that are currently flying or have flown can be sequences of point observations of aircraft states in relation to time. Each of these points contain a position (latitude, longitude and altitude) and velocity of an aircraft. The sequences of points are not a deterministic consequence of a flight plan that was filed for a flight with an air navigation service provider (and as included in the flight plan data 120 received from the information management sub-system 108). A flight plan typically contains a sequence of waypoints, airways and altitudes. For each segment between waypoints, and for each airway, there may be hundreds of track points of the same aircraft, and the tracks may not exactly match the waypoint and the airway. An analogous phenomenon occurs for altitudes. Thus, a correlation between a sequence of tracks and a flight plan may utilize a multistep processing and search approach.

In order to group variations incurred in real trajectories that are executions of the same flight plan, the flight plan reconstructing control unit 110 can employ a clustering technique. However, clustering would be ineffective if done with the original sequence of flight tracks, due to a high number of variables or data size. Accordingly, the flight plan reconstructing control unit 110 transforms the trajectory from a track-sequence representation to an intent-sequence representation. The flight plan reconstructing control unit 110 transforms the trajectory representation of an aircraft within the flight plan data 120 and/or the flight data 118 to an aircraft intent description language (AIDL or ICDL). Using aircraft intent, the flight plan reconstructing control unit 110 can fully describe a trajectory of an aircraft using a minimum or reduced amount of information, thereby reducing storage space and benefiting a trajectory algorithm.

The flight plan reconstructing control unit 110 adopts the aircraft intent to describe a trajectory, and transforms the aircraft intent from a set of four dimensional points to a set of AIDL instances and some initial conditions that results in the same trajectory (analogous to representing a straight line, instead of using N number of aligned points, using the initial point and the slope of the line). As a condition to generating the AIDL representation, the flight plan reconstructing control unit 110 adds other aircraft state relevant information, such as wind (using historical Weather), fuel on board, fuel flow, and the like, by using an iterative process to infer an initial mass of the aircraft, which in turn uses an aircraft performance model.

The flight plan reconstructing control unit 110 stores intent-based trajectories of the aircraft in a memory or database, which can be part of the flight plan reconstructing control unit 110 or in communication therewith through one or more wired or wireless connections. Small variations in aircraft state can end up in similar aircraft intent and may be associated to a single flight plan, thus this step aims at finding a trajectory which best represents a group of trajectories associated to a single strategy from the airline to go from origin to destination, which facilitates the next step of associating a trajectory to a synthesized flight plan. In addition, whenever it is possible to obtain the officially filed flight plan for a trajectory (for example, from the information management sub-system 108), such can be used as a criterion for clustering. Also, an aggregate measure of deviation between the flown trajectory and the corresponding filed flight plan is associated to each trajectory cluster. The flight plan reconstructing control unit 110 compares the filed flight plan, such as included within the flight plan data 120, with an actual flown trajectory, such as included within flight data 118, to reconstruct an actual flight plan as flown.

Next, the flight plan reconstruction control unit 110 uses the intent-based representation of the flown trajectory to become a flight plan representation that can be filed with an airspace authority (such as the FAA). In this manner, the flight plan reconstructing control unit 110 analyzes an official airspace structure and constraints available in the information management sub-system (such as SWIM Airspace Information services), and matches an aircraft trajectory as closely as possible to the waypoints, airways and altitudes that are allowed. For example, a best match can be obtained by maximizing correlation and minimizing cross-track differences. The filed flight plan, included within the flight plan data 120 and received by the flight plan reconstructing control unit 110, can be used in the matching process.

Next, the flight plan reconstructing control unit 110 stores a resulting synthetic flight plan in the flight plan database 114. If available, the officially filed flight plan corresponding to the synthetic plan is also stored, as well as an aggregate measure of deviation from clearance (or anti-adherence). When an individual requests a new flight plan starting at certain time, with certain origin and destination, the flight plan generating control unit 102 searches the flight plan database 114 for valid flight plans. The flight plan generating control unit 102 selects a flight plan that minimizes or otherwise reduces a ponderation of direct operating cost (fuel, elapsed time, ATC fees, etc.) and anti-adherence (for example, an indication of how much the executed flight diverges from the filed flight plan). The weight given to each of these factors is configurable. If the flight plan generating control unit finds a suitable flight plan within the flight plan database 114, the flight plan generating control unit 102 analyzes that flight plan for current weather forecast (as received from a weather forecasting service, for example) and payload, and then contacts the validation sub-system 116 (such as an airspace authority validation server, in order to determine if the flight plan continues to be valid for the present circumstances and airspace rules. If the new flight plan is valid, the flight plan generating control unit 102 outputs a valid flight plan signal to the user 104, which can be shown in the display 106. If, however, the validation sub-system 116 rejects the flight plan, the flight plan generating control unit 102 analyzes a rejection message received from the validation sub-system 116 to determine which segment(s) of the flight plan is invalid, and if such invalidity is temporary or permanent. If the invalidity is temporary, the flight plan generating control unit 102 marks that segment as temporarily unavailable in the flight plan database 114. If, however, the invalidity is permanent, the flight plan generating control unit 102 removes the flight plan or the invalid segment from the flight plan database 114.

As described herein, in at least one example, the flight plan generating control unit 102 receives a requested flight plan from the user interface 104. The flight plan request includes a flight plan from an origin to a destination. The flight plan control unit 102 then determines if the flight plan, as contained in the request, is included within data within the flight plan database 114. The flight plans stored in the flight plan database 114 can be flight plans as actually flown, instead of simply filed. In at least one example, the flight plans as stored in the flight plan database 114 are reconstructed by the flight plan reconstruction control unit 110 based on flight plans as filed compared with flight plans as actually flown. In response to the flight plan generating control unit 102 finding a match for the requested flight plan (a matched flight plan) within the flight plan database 114, the flight plan generating control unit 102 submits the matched flight plan to the validation sub-system 116. In response, the validation sub-system 116 outputs a message to the flight plan generating control unit 102, which either validates or rejects the matched flight plan.

Figure 3:
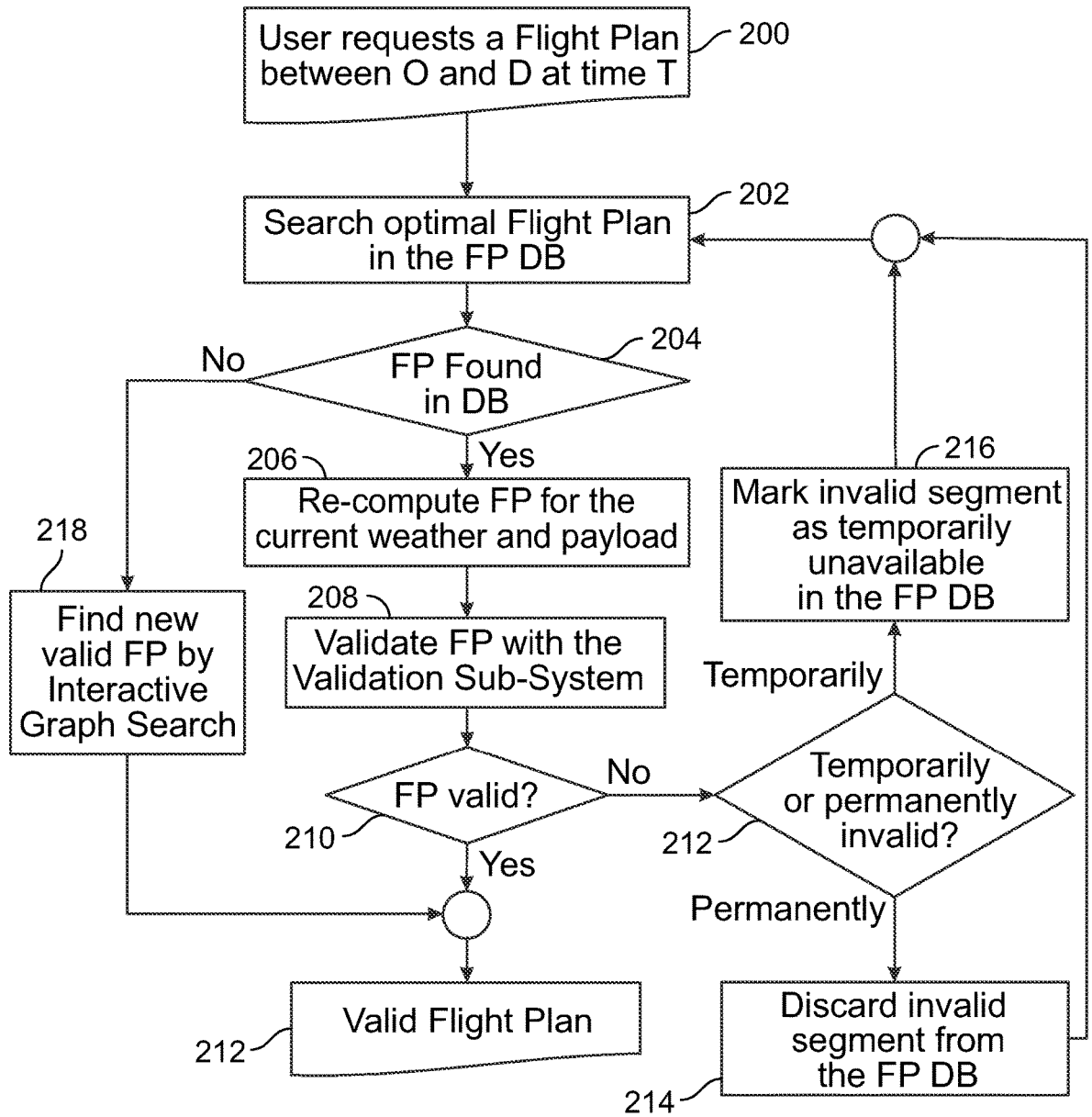
FIG. 3 illustrates a flow chart of a flight planning method, according to an example of the present disclosure.

FIG. 3 illustrates a flow chart of a flight planning method, according to an example of the present disclosure. Referring to FIGS. 2 and 3, at 200, a user requests a flight plan between an origin (for example, departure airport) and a destination (for example, arrival airport at time T. The user can make such request via the user interface 104 (such as via an input device, such as a keyboard, mouse, touchscreen interface, or the like). The flight plan generating control unit 102 receives the request from the user interface 200. At 202, based on the request, the flight plan generating control unit 114 searches the flight plan database 114 for a flight plan (such as an optimal flight plan) within the flight plan database 114. The flight plans stored in the flight plan database 114 are determined by the flight plan reconstructing control unit 110, such as by comparing filed flight plans, as included in the flight plan data 120, and flight plans as actually flown, as included in the flight data 118.

At 204, the flight plan generating control unit 102 determines if the flight plan is within the flight plan database 114. If, so, the method proceeds from 204 to 206, at which the flight plan generating control unit 102 recomputes the flight plan for current weather (as determined and received from a weather forecasting service, for example), and payload of the aircraft (as received from data received from the aircraft operator, for example). Next, at 208, the flight plan generating control unit 102 then outputs the flight plan to the validation sub-system 116 (such as an airspace authority validation server). The validation sub-system 116 determines if the flight plan is valid. The validation sub-system 116 outputs a validation status signal to the flight plan generating control unit 102. The validation status signal includes a message regarding whether or not the flight plan is valid. Based on the received validation status signal, at 210, the flight plan generating control unit 102 determines if the flight plan is valid. If the flight plan is valid, the flight plan generating control unit 212 determines the flight plan as valid at 212, and can indicate as much within the flight plan database 114. The flight plan generating control unit 102 can then output a validation signal to the user interface 104 indicating that the flight plan is valid, and that the aircraft can fly according to the flight plan. In at least one example, the aircraft can be automatically operated according to the validated flight plan, as determined by the flight plan generating control unit 102. In at least one other example, a pilot of the aircraft manually operates control according to the validated flight plan.

If, however, the validation status signal received from the validation sub-system 116 indicates that the flight plan is not valid at 210, the method proceeds to 212, at which the flight plan reviews the data received in the validation status signal to determine if the flight plan (or a portion thereof) is temporarily or permanently invalid. If the flight plan generating control unit 102 determines that the flight plan or a portion thereof is permanently invalid at 212, the method proceeds to 214, at which the flight plan generating control unit 102 discard the flight plan, or a portion thereof (such as an invalid segment) from the flight plan database 114, and the method returns to 202.

If, however, the flight plan generating control unit 102 determines that the flight plan or a portion thereof is only temporarily invalid at 212, the flight plan generating control unit 102 marks the flight plan or a portion thereof (such as a segment) as temporarily unavailable in the flight plan database 114 at 216, and the method returns to 202.

If at 204, the flight plan generating control unit 102 determines that the flight plan in 202 is not in the flight plan database 114, the method proceeds from 204 to 218, at which the flight plan generating control unit 102 finds a new valid flight plan by way of an iterative graph search, for example. The method then proceeds from 218, to 212.

In at least one example, the flight plan database 114 stores not only flight plans, but also a graph model of the airspace with waypoints and links between them. For each link, a flight cost may be associated therewith. For links belonging to valid flight plans, an estimation of the flight cost exclusive to that link is used. For links that have been rejected by the validation sub-system 116, a prohibitive (or otherwise relatively high) cost is associated therewith. Rejection of a flight plan by the validation sub-system may occur due to an airspace constraint, issued by the airspace authority, which was not previously known. If a rejection occurs for a flight plan, which was taken from the flight plan database, the flight plan generating control unit 102 determines that a new airspace constraint has been issued by the airspace authority Nevertheless, the flight generating control unit 102 can exhaust all possibilities existing in the flight plan database before trying to construct a new flight plan. If, after one or more iterations, the flight plan generating control unit is unable to find a suitable flight plan, step 218 is triggered.

The flight plan generating control unit 102 can perform an iterative graph search, as set forth in the step 218. In order to perform the iterative graph search, the flight plan generating control unit 102 finds fragments of the flight plan departing from the origin that lead closer to Destination—Origin Fragments (OF_i). The flight plan generating control unit that finds fragments of the flight plan arriving at the Destination which come from points closer to the Origin—Destination Fragments (DF_j). The flight plan generating control unit then ranks the combinations (OF_i.DF_j) by distance. The ranked list is referred to as ODFR.

For (OF_i,DF_j) in ODFR, let D(OF_i,DF_j) be shortest distance between OF_i and DF_j (by choosing the optimal combination of one waypoint in each one). If D(OF_i.DF_j) is 0, the flight plan generating control unit 102 combines (OF_i,DF_j) in a single flight plan, recomputes it for the current aircraft type, weather and payload, and stores it in the flight plan database 114, and returns this flight plan as a final result.

Otherwise, let L(OF_i,DF_j) be the direct link between OF_i and DF_j, corresponding to D(OF_i.DF_j). If L(OF_i, DF_j) has finite cost (it was not invalidated), the flight plan generating control unit 102 combines [OF_i.L(OF_i,DF_i), DF_j] in a single flight plan, recomputes it for current aircraft type, weather and payload, and submits to the validation sub-system 116 for validation. If the flight plan is valid, the flight plan generating control unit 102 stores the new flight plan in the flight plan database 114, and returns the flight plan as a final result. If the flight plan is invalid, the flight plan generating control unit 102 associates a high cost to L(OF_i.DF_j) in the flight plan database 114.

If (L(OF_i.DF_j) has very high cost), the flight plan generating control unit 102 uses heuristics to find the best waypoint W uniting OF_i to DF_j and combines [OF_i.L (OF_i,W), L(W,OF_j),DF_j] in a single flight plan, and submits to the validation sub-system 116 for validation. If the new FP is valid, the flight plan generating control unit 102 stores it in the flight plan database 114, and returns it as the final result. Otherwise, the flight plan generating control unit 102 checks which of the new segments L(OF_i,W) and L(W,OF_j) are valid or invalid. For those that are invalid, the flight plan generating control unit 102 marks costs as very high in the flight plan database 114. If one of these segments is valid, the flight plan generating control unit 102 stores its estimated finite cost and associates it with a valid flight plan fragment.

If a valid flight plan has been found, the flight plan generating control unit 102 terminates the loop and exits search. If, however, no valid flight plan has been found, the flight plan generating control unit checks if new flight plan fragments have been generated. If new flight plan fragments have been generated, the method may return to step 218.

In at least one example, the flight plan reconstruction control unit 110 can reconstruct a flight plan to be stored in the flight plan database 114 from a plurality of valid fragments in the database. For example, a flight plan within the flight plan database 114 can include different fragments that have not been invalidated. In at least one example, the fragments are stored in the flight plan database 114 and the flight plan generating control unit 102 combines various different fragments to generate a flight plan based on various portions of either actually flown flights or discovered segments that have not been invalidated.

The principles that lead this search (by the flight plan generating control unit 102) to eventually find a valid solution are that it will exhaustively find which flight path segments are valid or invalid (temporarily or not). Further, each flight path segment which is found as valid in a validation from the validation sub-system 116 becomes part of a valid flight plan fragment which will then reduce the number of validation queries. Additionally, each valid flight plan fragment can be successively pruned into shorter fragments, in order to generate more fragments and increase the possibilities of connections between origin and destination. For example, if there has never been a flight plan between Origin (O) and Destination (D) in the flight plan database 114, the search will start by trying the direct link between O and D. On the other hand, if there was a valid plan between O and D in the flight plan database 102, and there are changes in airspace constraints so radical that all previous flight plans and flight plan fragments associated to O and D become invalid, the search will prune those previously valid flight plan fragments successively, marking high costs to the invalid segments throughout. In this latter situation, the search explores possibilities of using other waypoints (e.g., published by the information management sub-system 108), but with knowledge of which links are invalid.

In at least one example, the flight plan generating control unit 102 uses pre-validated path fragments as elements of the search, along with detached waypoints, thereby accelerating the search by decreasing the universe of possible paths and facilitating validity with the validation sub-system 116 and clearance adherence of the resulting flight plans.

The systems and methods of the present disclosure are self-updating because the flight plan database 114, and corresponding graph model of the airspace, are automatically and continually updated with data collected from actual flights and massive numbers of validation queries submitted to the validation sub-system 116. The graph model of the airspace is able to represent any of the types of airspace constraints currently existing, either exactly or approximately, and require little or no change as new types of airspace constraints appear in the future, thus minimizing or otherwise reducing the need for manual program code updates.

The graph model of the airspace, as any graph model, is based on nodes or and links between the nodes. Each node can be a waypoint, called a "fix" in airspace terminology, with a single altitude or an altitude band. Airport runway thresholds are terminal nodes in this graph model. These nodes can be obtained in SWIM or in digital documents published by the national airspace authorities. While some of the fixes are restricted in altitude, most are not.

In order to allow automatic discovery of airspace constraint rules, the flight plan generating control unit 102 can assume that any node is linked with any other node. That is, it is a fully connected graph, although the vast quantity of links may not be explicitly represented in the database or in memory, in order to be computationally more efficient. All links begin to exist implicitly (simply by definition), without any data associated. When searching for a flight path, the flight generating control unit 102 can find which sequences of nodes are suitable to the Origin-Destination required, according to aircraft type, payload, etc. Once a link between two nodes becomes a part of a suitable sequence, it starts to be represented explicitly in the database, with traversal costs associated therewith. Two types of traversal costs can be associated with these links. A generic traversal cost is the geodesical distance between the two nodes. A specific traversal cost is associated to aircraft type, altitude, weather, and other specific parameters, and are expressed in physical units such as time (traversal time) and fuel consumed. The flight plan generating control unit 102 can also use weather-independent synthetic cost estimations.

Once the flight plan generating control unit 102 finds a suitable sequence of nodes for the Origin-Destination required, the flight plan generating control unit 102 submits the associated flight plan to the validation sub-system 116, as described herein. If a rejection is received, the rejection message is interpreted and the flight plan generating control unit 102 determines segments of the flight plan that are most likely to be invalid or not. The segments detected as invalid, already explicitly existing in the flight plan database 114, are updated with artificially very high costs, so that the flight plan generating control unit 102 avoids them in the future. If the segment is detected as valid, the best-estimation costs will remain associated to the link in the flight plan database 114 and can be reused in future searches, saving computation time. There may be some links that are never explored, such as two waypoints which are geodesically coincident but at different altitudes, but such links remain only theoretical and do not consume computing resources. The graph model can also represent free-route airspace sectors, because traversing such sectors require an entry fix and an exit fix, and the flight plan generating control unit 102 can discover the allowed altitude bands by trial and error.

As described, the flight plan generating control unit 102 interprets validation responses from the validation sub-system 116. While the validation sub-system 116 can be subject to international conventions, each regional or national implementation can use different response messages and different internal logic. The flight plan generating control unit 102 automatically adapts to changes. For example, the flight plan generating control unit 102 interprets messages form the validation sub-system 116 by using a Recurrent Neural Network (RNN) model in order to detect which segments or attributes of the flight plan are valid or invalid. If some problem with the flight path is detected and still is not possible to know exactly which segments are invalid, the iterative graph search proceeds by pruning existing flight path segments, but the RNN observes the pruning succession, with reference to the rejection message from the validation sub-system 116, in order to train its Neural Network to associate a delimited part of the failed flight path to the rejection. By continually observing iterations of the process of search, check validity, fail, fix and succeed, the RNN will attain the capability of automatically updating itself to changes in the airspace constraint rules and also to changes the query/response language, and minimize or otherwise reduce the need of manual program coding.

Figure 4:
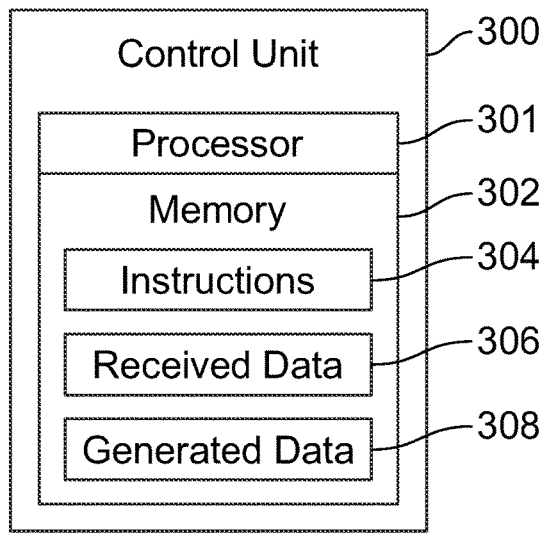
FIG. 4 illustrates a schematic block diagram of a control unit, according to an example of the present disclosure.

FIG. 4 illustrates a schematic block diagram of a control unit 300, according to an example of the present disclosure. The flight plan generating control unit 102 and the flight plan reconstructing control unit 110 can be configured as shown in FIG. 4. In at least one example, the control unit 300 includes at least one processor 301 in communication with a memory 302. The memory 302 stores instructions 304, received data 306, and generated data 308. The control unit 300 shown in FIG. 4 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, a quantum computer, and any other circuit or processor including hardware, software, or a combination thereof capable of executing the functions described herein. Such are exemplary only, and are thus not intended to limit in any way the definition and/or meaning of such terms. For example, the flight plan generating control unit 102 and the flight plan reconstructing control unit 110 may be or include one or more processors that are configured to control operation, as described herein.

The flight plan generating control unit 102 and the flight plan reconstructing control unit 110 are configured to execute a set of instructions that are stored in one or more data storage units or elements (such as one or more memories), in order to process data. For example, the flight plan generating control unit 102 and the flight plan reconstructing control unit 110 may include or be coupled to one or more memories. The data storage units may also store data or other information as desired or needed. The data storage units may be in the form of an information source or a physical memory element within a processing machine.

The set of instructions may include various commands that instruct the flight plan generating control unit 102 and the flight plan reconstructing control unit 110 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the flight plan generating control unit 102 and the flight plan reconstructing control unit 110. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the flight plan generating control unit 102 and the flight plan reconstructing control unit 110 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Referring to 1-4, examples of the subject disclosure provide systems and methods that allow large amounts of data to be quickly and efficiently analyzed by a computing device. For example, the control units can analyze data from filed flight plans, actually flown flight plans, and stored flight plans related to hundreds, thousands, or more aircraft in real time. As such, large amounts of data, which may not be discernable by human beings, are being tracked and analyzed. The vast amounts of data are efficiently organized and/or analyzed by the control units, as described herein. The maintenance control units analyze the data in a relatively short time in order to quickly and efficiently flight plans for aircraft. A human being would be incapable of efficiently analyzing such vast amounts of data in such a short time. As such, examples of the present disclosure provide increased and efficient functionality, and vastly superior performance in relation to a human being analyzing the vast amounts of data.

In at least one example, components of the system 100, such as the flight plan generating control unit 102 and the flight plan reconstructing control unit 110, provide and/or enable a computer system to operate as a special computer system for determining flight plans for aircraft. The flight plan generating control unit 102 and the flight plan reconstructing control unit 110 improves upon standard computing devices by reconstructing, determining, and/or generating flight plans for aircraft in an efficient and effective manner.

In at least one example, all or part of the systems and methods described herein may be or otherwise include an artificial intelligence (AI) or machine-learning system that can automatically perform the operations of the methods also described herein. For example, the flight plan generating control unit 102 and the flight plan reconstructing control unit 110 can be artificial intelligence or machine learning systems. These types of systems may be trained from outside information and/or self-trained to repeatedly improve the accuracy with how data is analyzed to determine optimal flight plans for aircraft. Over time, these systems can improve by determining flight plans with increasing accuracy and speed, thereby significantly reducing the likelihood of any potential errors. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve flight plan determination. The training minimizes conflicts and interference by performing an iterative training algorithm, in which the systems are retrained with an updated set of data (for example, data received in real time from numerous aircraft) and based on the feedback examined prior to the most recent training of the systems. This provides a robust analysis model that can better determined flight plans.

Figure 5:
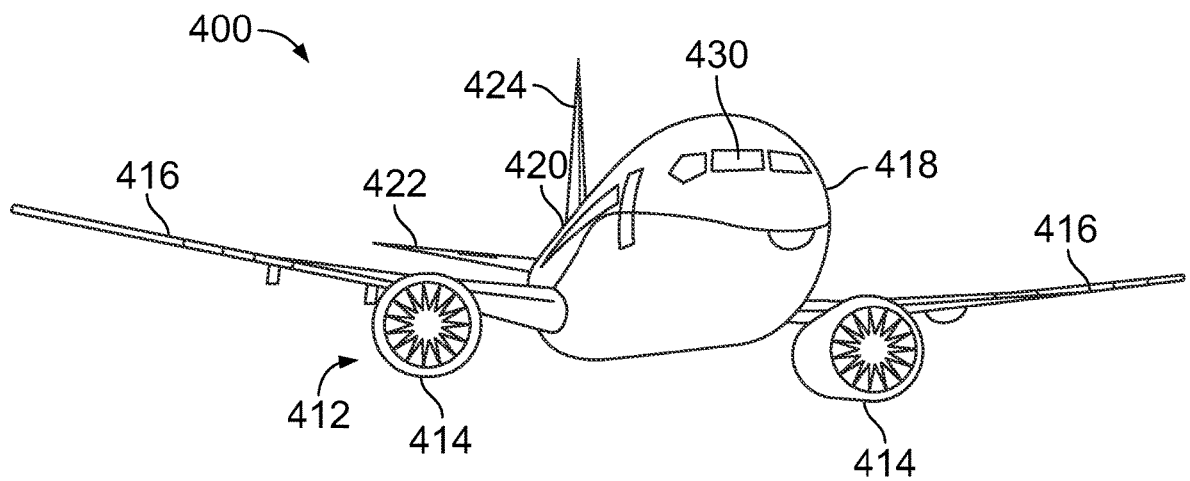
FIG. 5 illustrates a perspective front view of an aircraft, according to an example of the present disclosure.

FIG. 5 illustrates a perspective front view of an aircraft 400, according to an example of the present disclosure. The aircraft 400 includes a propulsion system 412 that includes engines 414, for example. Optionally, the propulsion system 412 may include more engines 414 than shown. The engines 414 are carried by wings 416 of the aircraft 400. In other examples, the engines 414 may be carried by a fuselage 418 and/or an empennage 420. The empennage 420 may also support horizontal stabilizers 422 and a vertical stabilizer 424. The fuselage 418 of the aircraft 400 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like. FIG. 5 shows an example of an aircraft 400. It is to be understood that the aircraft 400 can be sized, shaped, and configured differently than shown in FIG. 5.

Further, the disclosure comprises examples according to the following clauses:

Clause 1. A system comprising:
a flight plan generating control unit configured to:
receive a flight plan request for an aircraft from a user interface,
determine if the flight plan request matches a flight plan within a flight plan database,
in response to the flight plan request matching the flight plan within the flight plan database, submit the flight plan to a validation sub-system, and
in response to the flight plan request not matching the flight plan within the flight plan database, determine a new flight plan.

Clause 2. The system of Clause 1, further comprising a flight plan reconstruction control unit configured to determine one or more portions of the flight plan from one or more flights plans as actually flown.

Clause 3. The system of Clause 2, wherein the flight plan reconstruction control unit is configured to determine the one or more portions of the flight plan based on flight data received from a tracking sub-system.

Clause 4. The system of Clauses 2 or 3, wherein the one or more flight plans as actually flown differ from one or more flight plans as filed.

Clause 5. The system of any of Clauses 1-4, wherein the flight plan is determined from a plurality of flight segments that are one or both of a plurality of flight plans as actually flown or logically and physically possible and have not been invalidated.

Clause 6. The system of any of Clauses 1-5, wherein the flight plan generating control unit is further configured to, in response to the validation sub-system outputting a message indicating that the flight plan is invalid, determine if at least a portion of the flight plan is temporarily or permanently invalid.

Clause 7. The system of Clause 6, wherein the flight plan generating control unit is further configured to discard the at least a portion of the flight plan from the flight plan database if the at least a portion of the flight plan is permanently invalid.

Clause 8. The system of Clauses 6 or 7, wherein the flight plan generating control unit is further configured to indicate that the at least a portion of the flight plan is temporarily invalid in response to the message indicating the at least a portion of the flight plan is temporarily invalid.

Clause 9. The system of any of Clauses 1-8, wherein the flight plan generating control unit is configured to determine the new flight plan via an iterative graph search.

Clause 10. The system of any of Clauses 1-9, wherein the flight plan generating control unit is further configured to recompute the flight plan based on one or both of current weather or payload of the aircraft before submitting the flight plan to the validation sub-system.

Clause 11. The system of any of Clauses 1-10, wherein the flight plan generating control unit is an artificial intelligence or machine learning system.

Clause 12. A method comprising:
receiving, by a flight plan generating control unit, a flight plan request for an aircraft from a user interface;
determining, by the flight plan generating control unit, if the flight plan request matches a flight plan within a flight plan database;
in response to the flight plan request matching the flight plan within the flight plan database, submitting, by the flight plan generating control unit, the flight plan to a validation sub-system; and
in response to the flight plan request not matching the flight plan within the flight plan database, determining, by the flight plan generating control unit, a new flight plan.

Clause 13. The method of Clause 12, further comprising determining, by a flight plan reconstruction control unit, one or more portions of the flight plan from one or more flights plans as actually flown.

Clause 14. The method of Clause 13, wherein said determining, by the flight plan reconstruction control unit, is based on flight data received from a tracking sub-system.

Clause 15. The method of Clauses 13 or 14, wherein the one or more flight plans as actually flown differ from one or more flight plans as filed.

Clause 16. The method of any of Clauses 12-15, wherein said determining is based on a plurality of flight segments of a plurality of flight plans as actually flown.

Clause 17. The method of any of Clauses 12-16, further comprising:
in response to the validation sub-system outputting a message indicating that the flight plan is invalid, determining, by the flight plan generating control unit, if at least a portion of the flight plan is temporarily or permanently invalid;
discarding, by the flight plan generating control unit, the at least a portion of the flight plan from the flight plan database if the at least a portion of the flight plan is permanently invalid; and
indicating, by the flight plan generating control unit, that the at least a portion of the flight plan is temporarily invalid in response to the message indicating the at least a portion of the flight plan is temporarily invalid.

Clause 18. The method of any of Clauses 12-17, wherein said determining the new flight plan comprises determining the new flight plan via an iterative graph search.

Clause 19. The method of any of Clauses 12-18, further comprising recomputing, by the flight plan generating control unit, the flight plan based on one or both of current weather or payload of the aircraft before submitting the flight plan to the validation sub-system.

Clause 20. A non-transitory computer-readable storage medium comprising executable instructions that, in response to execution, cause one or more control units comprising a processor, to perform operations comprising:
determining, by a flight plan reconstruction control unit, one or more portions of a flight plan from one or more flights plans as actually flown based on flight data received from a tracking sub-system, wherein the one or more flight plans as actually flown differ from one or more flight plans as filed;

receiving a flight plan request for an aircraft from a user interface;

determining if the flight plan request matches the flight plan within a flight plan database;

recomputing the flight plan based on one or both of current weather or payload of the aircraft before submitting the flight plan to a validation sub-system;

in response to the flight plan request matching the flight plan within the flight plan database, submitting the flight plan to the validation sub-system;

in response to the flight plan request not matching the flight plan within the flight plan database, determining a new flight plan via an iterative graph search;

in response to the validation sub-system outputting a message indicating that the flight plan is invalid, determining if at least a portion of the flight plan is temporarily or permanently invalid;

discarding the at least a portion of the flight plan from the flight plan database if the at least a portion of the flight plan is permanently invalid; and indicating that the at least a portion of the flight plan is temporarily invalid in response to the message indicating the at least a portion of the flight plan is temporarily invalid.

As described herein, examples of the present disclosure provide flight planning systems and methods that account for various dynamic factors, such as route and airspace availability, as well as stable factors, such as airspace restrictions. Examples of the present disclosure provide efficient and effective flight planning systems and methods. Further, examples of the present disclosure provide systems and methods that are able to provide flight plans that are accepted and cleared worldwide.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
an aircraft configured to travel from a departure location to an arrival location;
a user interface onboard the aircraft; and
a flight plan generating control unit including an artificial intelligence or machine learning system, wherein the flight plan generating control unit is configured to:
receive a flight plan request for the aircraft from the user interface onboard the aircraft,
determine if the flight plan request matches a flight plan within a flight plan database, wherein the flight plan includes a route between the departure location and the arrival location,
in response to the flight plan request matching the flight plan within the flight plan database, submit the flight plan to a validation sub-system, and
in response to the flight plan request not matching the flight plan within the flight plan database, determine a new flight plan via an iterative graph search.

2. The system of claim 1, further comprising a flight plan reconstruction control unit configured to determine one or more portions of the flight plan from one or more flights plans as actually flown.

3. The system of claim 2, wherein the flight plan reconstruction control unit is configured to determine the one or more portions of the flight plan based on flight data received from a tracking sub-system.

4. The system of claim 2, wherein the one or more flight plans as actually flown differ from one or more flight plans as filed.

5. The system of claim 1, wherein the flight plan includes portions that are one or both of determined from a plurality of flight segments of a plurality a plurality of flight plans as actually flown, or logically and physically possible and have not been marked as invalid in the flight plan database.

6. The system of claim 1, wherein the flight plan generating control unit is further configured to, in response to the validation sub-system outputting a message indicating that the flight plan is invalid, determine if at least a portion of the flight plan is temporarily or permanently invalid.

7. The system of claim 6, wherein the flight plan generating control unit is further configured to discard the at least a portion of the flight plan from the flight plan database if the at least a portion of the flight plan is permanently invalid.

8. The system of claim 6, wherein the flight plan generating control unit is further configured to indicate that the at least a portion of the flight plan is temporarily invalid in response to the message indicating the at least a portion of the flight plan is temporarily invalid.

9. The system of claim 1, wherein the flight plan generating control unit is further configured to recompute the flight plan based on one or both of current weather or payload of the aircraft before submitting the flight plan to the validation sub-system.

10. A method comprising:
   inputting a flight plan request via a user interface onboard an aircraft;
   receiving, by a flight plan generating control unit including an artificial intelligence or machine learning system having one or more processors, the flight plan request for the aircraft from the user interface onboard the aircraft;
   determining, by the flight plan generating control unit, if the flight plan request matches a flight plan within a flight plan database wherein the flight plan includes a route between the departure location and the arrival location;
   in response to the flight plan request matching the flight plan within the flight plan database, submitting, by the flight plan generating control unit, the flight plan to a validation sub-system;
   in response to the flight plan request not matching the flight plan within the flight plan database, determining, by the flight plan generating control unit, a new flight plan via an iterative graph search; and
   operating the aircraft to travel from a departure location to an arrival location according to one of the flight plan or the new flight plan.

11. The method of claim 10, further comprising determining, by a flight plan reconstruction control unit, one or more portions of the flight plan from one or more flights plans as actually flown.

12. The method of claim 11, wherein said determining, by the flight plan reconstruction control unit, is based on flight data received from a tracking sub-system.

13. The method of claim 11, wherein the one or more flight plans as actually flown differ from one or more flight plans as filed.

14. The method of claim 10, wherein said determining is based on a plurality of flight segments of a plurality of flight plans as actually flown.

15. The method of claim 10, further comprising:
   in response to the validation sub-system outputting a message indicating that the flight plan is invalid, determining, by the flight plan generating control unit, if at least a portion of the flight plan is temporarily or permanently invalid;
   discarding, by the flight plan generating control unit, the at least a portion of the flight plan from the flight plan database if the at least a portion of the flight plan is permanently invalid; and
   indicating, by the flight plan generating control unit, that the at least a portion of the flight plan is temporarily invalid in response to the message indicating the at least a portion of the flight plan is temporarily invalid.

16. The method of claim 10, wherein said determining the new flight plan comprises determining the new flight plan via an iterative graph search.

17. The method of claim 10, further comprising recomputing, by the flight plan generating control unit, the flight plan based on one or both of current weather or payload of the aircraft before submitting the flight plan to the validation sub-system.

* * * * *